(12) United States Patent
Millet

(10) Patent No.: US 9,143,351 B2
(45) Date of Patent: *Sep. 22, 2015

(54) IDENTIFYING NODES IN A RING NETWORK

(75) Inventor: Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 514 days.

This patent is subject to a terminal disclaimer.

(21) Appl. No.: 13/532,771

(22) Filed: Jun. 25, 2012

(65) Prior Publication Data

US 2013/0022049 A1    Jan. 24, 2013

Related U.S. Application Data

(60) Continuation of application No. 12/762,362, filed on Apr. 18, 2010, now Pat. No. 8,208,409, which is a division of application No. 11/460,977, filed on Jul. 29, 2006, now Pat. No. 7,890,663, which is a division of application No. 09/894,471, filed on Jun. 28, 2001, now Pat. No. 7,181,547.

(51) Int. Cl.
*H04L 12/42* (2006.01)
*H04L 12/24* (2006.01)

(52) U.S. Cl.
CPC .................. *H04L 12/42* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 4,590,468 A | 5/1986 | Stieglitz | |
| 4,667,287 A | 5/1987 | Allen et al. | |
| 4,667,323 A | 5/1987 | Engdahl et al. | |
| 4,726,018 A | 2/1988 | Bux et al. | |
| 5,371,852 A | 12/1994 | Attanasio et al. | |
| 5,490,252 A | 2/1996 | Macera et al. | |
| 5,550,816 A | 8/1996 | Hardwick et al. | |
| 5,598,414 A | 1/1997 | Walser et al. | |
| 5,633,866 A | 5/1997 | Callon | |
| 5,784,648 A * | 7/1998 | Duckwall | 710/40 |
| 5,825,772 A | 10/1998 | Dobbins et al. | |

(Continued)

FOREIGN PATENT DOCUMENTS

EP    1050181    11/2007

OTHER PUBLICATIONS

Non-Final Office Action for U.S. Appl. No. 11/849,352 mailed Jul. 17, 2009.

(Continued)

*Primary Examiner* — Timothy J Weidner
(74) *Attorney, Agent, or Firm* — Hamilton, DeSanctis & Cha LLP

(57) ABSTRACT

Methods, systems and data structures for determining a token master on a ring network are provided. According to one embodiment, determining a token master on a ring network includes receiving a packet containing a network token at a first node on the network. If the network token does not arrive within a preselected timeout period, generating an arbitration token. If the packet contains an arbitration token, determining if the arbitration token was modified by a higher priority node of the network and if not, setting the first node as a token master and converting the arbitration token to a packet transmission token. Arbitration tokens are used to identify a token master that is responsible for generating a packet transmission token onto the network, whereas the packet transmission token authorizes a transmitting node that has most recently received the packet transmission token to transmit locally generated packets onto the network.

19 Claims, 6 Drawing Sheets

(56) References Cited

U.S. PATENT DOCUMENTS

| | | |
|---|---|---|
| 5,892,924 A | 4/1999 | Lyon et al. |
| 5,920,705 A | 7/1999 | Lyon et al. |
| 5,964,847 A | 10/1999 | Booth et al. |
| 5,987,521 A | 11/1999 | Arrowood et al. |
| 6,032,193 A | 2/2000 | Sullivan |
| 6,058,429 A | 5/2000 | Ames et al. |
| 6,118,791 A | 9/2000 | Fichou et al. |
| 6,137,777 A | 10/2000 | Vaid et al. |
| 6,141,349 A * | 10/2000 | Ikeda et al. .................. 370/405 |
| 6,147,970 A | 11/2000 | Troxel |
| 6,172,980 B1 | 1/2001 | Flander et al. |
| 6,172,991 B1 | 1/2001 | Mori |
| 6,173,399 B1 | 1/2001 | Gilbrech |
| 6,175,867 B1 | 1/2001 | Taghadoss |
| 6,192,051 B1 | 2/2001 | Lipman et al. |
| 6,212,556 B1 | 4/2001 | Arunachalam |
| 6,243,580 B1 | 6/2001 | Garner |
| 6,246,682 B1 | 6/2001 | Roy et al. |
| 6,249,519 B1 | 6/2001 | Rangachar |
| 6,256,295 B1 | 7/2001 | Callon |
| 6,260,072 B1 | 7/2001 | Rodriguez |
| 6,272,500 B1 | 8/2001 | Sugita |
| 6,278,708 B1 | 8/2001 | Von Hammerstein et al. |
| 6,286,038 B1 | 9/2001 | Reichmeyer et al. |
| 6,343,083 B1 | 1/2002 | Mendelson et al. |
| 6,397,253 B1 | 5/2002 | Quinlan et al. |
| 6,453,406 B1 | 9/2002 | Sarnikowski et al. |
| 6,493,349 B1 | 12/2002 | Casey |
| 6,526,056 B1 | 2/2003 | Rekhter et al. |
| 6,532,088 B1 | 3/2003 | Dantu |
| 6,542,466 B1 | 4/2003 | Pashtan et al. |
| 6,542,502 B1 | 4/2003 | Herring et al. |
| 6,553,423 B1 | 4/2003 | Chen |
| 6,556,544 B1 | 4/2003 | Lee |
| 6,556,547 B1 | 4/2003 | Srikanth et al. |
| 6,608,816 B1 | 8/2003 | Nichols |
| 6,611,522 B1 | 8/2003 | Zheng et al. |
| 6,614,781 B1 | 9/2003 | Elliott et al. |
| 6,614,792 B1 | 9/2003 | Pazy et al. |
| 6,625,156 B2 | 9/2003 | Shaio et al. |
| 6,629,128 B1 | 9/2003 | Glass |
| 6,633,571 B1 | 10/2003 | Sakamoto et al. |
| 6,636,516 B1 | 10/2003 | Yamano |
| 6,639,897 B1 | 10/2003 | Shiomoto et al. |
| 6,640,248 B1 | 10/2003 | Jorgensen |
| 6,654,787 B1 | 11/2003 | Aronson et al. |
| 6,658,013 B1 | 12/2003 | de Boer et al. |
| 6,665,725 B1 | 12/2003 | Dietz et al. |
| 6,668,282 B1 | 12/2003 | Booth et al. |
| 6,680,922 B1 | 1/2004 | Jorgensen |
| 6,694,437 B1 | 2/2004 | Pao et al. |
| 6,697,359 B1 | 2/2004 | George |
| 6,697,360 B1 | 2/2004 | Gai et al. |
| 6,732,314 B1 | 5/2004 | Borella et al. |
| 6,738,821 B1 | 5/2004 | Wilson et al. |
| 6,754,662 B1 | 6/2004 | Li |
| 6,775,267 B1 | 8/2004 | Kung |
| 6,778,502 B2 | 8/2004 | Ricciulli |
| 6,785,224 B2 | 8/2004 | Uematsu et al. |
| 6,802,068 B1 | 10/2004 | Guruprasad |
| 6,816,462 B1 | 11/2004 | Booth et al. |
| 6,820,210 B1 | 11/2004 | Daruwalla et al. |
| 6,822,958 B1 | 11/2004 | Branth et al. |
| 6,839,348 B2 | 1/2005 | Tang et al. |
| 6,850,531 B1 | 2/2005 | Rao et al. |
| 6,868,082 B1 | 3/2005 | Allen et al. |
| 6,892,237 B1 | 5/2005 | Gai et al. |
| 6,894,994 B1 | 5/2005 | Grob et al. |
| 6,907,039 B2 | 6/2005 | Shen |
| 6,914,907 B1 | 7/2005 | Bhardwaj et al. |
| 6,920,146 B1 | 7/2005 | Johnson et al. |
| 6,922,774 B2 | 7/2005 | Meushaw et al. |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton et al. |
| 6,982,984 B1 | 1/2006 | Asayesh et al. |
| 6,985,438 B1 | 1/2006 | Tschudin |
| 6,985,956 B2 | 1/2006 | Luke et al. |
| 6,990,103 B1 | 1/2006 | Gollamudi |
| 7,012,919 B1 | 3/2006 | So et al. |
| 7,020,143 B2 | 3/2006 | Zdan |
| 7,042,848 B2 | 5/2006 | Santiago et al. |
| 7,046,665 B1 | 5/2006 | Walrand et al. |
| 7,054,311 B2 | 5/2006 | Norman et al. |
| 7,062,570 B2 | 6/2006 | Hong et al. |
| 7,082,477 B1 | 7/2006 | Sadhasivam et al. |
| 7,089,293 B2 | 8/2006 | Grosner et al. |
| 7,096,495 B1 | 8/2006 | Warrier et al. |
| 7,136,351 B2 | 11/2006 | Metin et al. |
| 7,139,271 B1 | 11/2006 | Parruck et al. |
| 7,145,898 B1 | 12/2006 | Elliott |
| 7,149,216 B1 | 12/2006 | Cheriton |
| 7,161,904 B2 | 1/2007 | Hussain et al. |
| 7,174,372 B1 | 2/2007 | Sarkar |
| 7,181,547 B1 | 2/2007 | Millet |
| 7,221,945 B2 | 5/2007 | Milford et al. |
| 7,225,259 B2 | 5/2007 | Ho et al. |
| 7,263,091 B1 | 8/2007 | Woo et al. |
| 7,266,120 B2 | 9/2007 | Cheng et al. |
| 7,269,157 B2 | 9/2007 | Klinker et al. |
| 7,278,055 B2 | 10/2007 | Talaugon et al. |
| 7,313,614 B2 | 12/2007 | Considine et al. |
| 7,316,029 B1 | 1/2008 | Parker et al. |
| 7,324,489 B1 | 1/2008 | Iyer |
| 7,324,889 B2 | 1/2008 | Lyer |
| 7,340,535 B1 | 3/2008 | Alam |
| 7,359,404 B1 | 4/2008 | Allan |
| 7,499,398 B2 | 3/2009 | Damon et al. |
| 7,580,373 B2 | 8/2009 | Millet |
| 7,587,633 B2 | 9/2009 | Talaugon et al. |
| 7,746,873 B2 | 6/2010 | Saito et al. |
| 7,830,787 B1 | 11/2010 | Wijnands et al. |
| 7,890,663 B2 * | 2/2011 | Millet ........................... 709/251 |
| 8,208,409 B2 | 6/2012 | Millet |
| 8,306,040 B2 | 11/2012 | Desai et al. |
| 8,320,279 B2 | 11/2012 | Sarkar et al. |
| 8,369,258 B2 | 2/2013 | Balay et al. |
| 8,374,088 B2 | 2/2013 | Balay et al. |
| 8,503,463 B2 | 8/2013 | Desai et al. |
| 8,583,800 B2 | 11/2013 | Matthews et al. |
| 8,644,311 B2 | 2/2014 | Cheng et al. |
| 8,650,390 B2 | 2/2014 | Sun et al. |
| 2001/0028636 A1 | 10/2001 | Skog et al. |
| 2001/0043571 A1 | 11/2001 | Kent |
| 2002/0049902 A1 | 4/2002 | Rhodes |
| 2002/0062344 A1 | 5/2002 | Ylonen et al. |
| 2002/0075901 A1 | 6/2002 | Perlmutter et al. |
| 2002/0099849 A1 | 7/2002 | Alfieri et al. |
| 2002/0120720 A1 | 8/2002 | Moir |
| 2002/0184387 A1 | 12/2002 | Yamaya et al. |
| 2002/0186661 A1 | 12/2002 | Santiago et al. |
| 2003/0033401 A1 | 2/2003 | Poisson et al. |
| 2003/0108041 A1 | 6/2003 | Aysan |
| 2003/0112799 A1 | 6/2003 | Chandra et al. |
| 2003/0117954 A1 | 6/2003 | De Neve et al. |
| 2003/0169747 A1 | 9/2003 | Wang |
| 2003/0200295 A1 | 10/2003 | Roberts et al. |
| 2003/0223406 A1 | 12/2003 | Balay |
| 2004/0037279 A1 | 2/2004 | Zelig et al. |
| 2004/0095932 A1 | 5/2004 | Astarabadi et al. |
| 2004/0141521 A1 | 7/2004 | George |
| 2005/0018609 A1 | 1/2005 | Dally et al. |
| 2005/0213589 A1 | 9/2005 | Shih |
| 2006/0087969 A1 | 4/2006 | Santiago et al. |
| 2006/0265519 A1 | 11/2006 | Millet |
| 2007/0237172 A1 | 10/2007 | Zelig et al. |
| 2007/0291755 A1 | 12/2007 | Cheng et al. |
| 2009/0225759 A1 | 9/2009 | Hussain et al. |
| 2010/0011245 A1 | 1/2010 | Talaugon et al. |
| 2010/0189016 A1 | 7/2010 | Millet |
| 2011/0249812 A1 | 10/2011 | Barnhouse et al. |
| 2012/0057460 A1 | 3/2012 | Hussain |
| 2012/0069850 A1 | 3/2012 | Desai |

(56) References Cited

U.S. PATENT DOCUMENTS

| | | | |
|---|---|---|---|
| 2012/0072568 A1 | 3/2012 | Matthews |
| 2012/0099596 A1 | 4/2012 | Balay |
| 2012/0324216 A1 | 12/2012 | Sun |
| 2012/0324532 A1 | 12/2012 | Matthews |
| 2013/0083697 A1 | 4/2013 | Sarkar |
| 2013/0156033 A1 | 6/2013 | Balay |
| 2013/0170346 A1 | 7/2013 | Balay |
| 2013/0308460 A1 | 11/2013 | Hussain et al. |
| 2013/0315232 A1 | 11/2013 | Desai et al. |
| 2014/0177631 A1 | 6/2014 | Cheng et al. |
| 2015/0195098 A1 | 7/2015 | Cheng et al. |

OTHER PUBLICATIONS

Non-Final Office Action for U.S. Appl. No. 10/991,970 mailed May 18, 2009.
Final Office Action for U.S. Appl. No. 12/467,609 mailed Apr. 19, 2011.
Non-Final Office Action for U.S. Appl. No. 12/328,858 mailed Apr. 15, 2011.
Non-Final Rejection for U.S. Appl. No. 13/600,179 mailed Jul. 19, 2013.
Notice of Allowance for U.S. Appl. No. 13/295,077 mailed Jul. 15, 2013.
Non-Final Rejection for U.S. Appl. No. 12/906,999 mailed Nov. 21, 2012.
Non-Final Rejection for U.S. Appl. No. 13/050,387 mailed Nov. 13, 2012.
Examiner's Answer mailed Feb. 19, 2014.
Non-Final Rejection for U.S. Appl. No. 13/338,213 mailed Jun. 28, 2013.
Notice of Allowance for U.S. Appl. No. 13/154,330 mailed Jun. 26, 2013.
Non-Final Rejection for U.S. Appl. No. 13/585,727 mailed Jun. 17, 2013.
Non-Final Rejection for U.S. Appl. No. 13/154,330 mailed Mar. 27, 2013.
Notice of Allowance for U.S. Appl. No. 13/756,071 mailed Jun. 30, 2014.
Non-Final Rejection for U.S. Appl. No. 13/756,071 mailed Jun. 6, 2014.
Final Rejection for U.S. Appl. No. 13/338,213 mailed May 7, 2014.
Notice of Allowance for U.S. Appl. No. 13/959,103 mailed Sep. 26, 2014.
Non-Final Rejection for U.S. Appl. No. 13/959,103 mailed Aug. 19, 2014.
Notice of Allowance for U.S. Appl. No. 13/022,696 mailed Oct. 12, 2012.
Non-Final Rejection for for U.S. Appl. No. 13/015,880 mailed Oct. 2, 2012.
Notice of Allowance for U.S. Appl. No. 13/092,962 mailed Nov. 12, 2013.
Notice of Allowance for U.S. Appl. No. 13/585,727 mailed Oct. 30, 2013.
Non-Final Rejection for U.S. Appl. No. 13/950,077 mailed Oct. 9, 2014.
Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.
Amendment and Response filed on Mar. 13, 2006 for U.S. Appl. No. 09/663,483.
Advisory Action dated Nov. 12, 2004 for U.S. Appl. No. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr. 6, 2005 for U.S. Appl. No. 09/663,484.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
IEEE Potentials Publication; "Local Area Networks" Dec. 95/Jan. 96; pp. 6. http://www.ece.uc.edu/-paw/potentials/sample.
Office Action dated Oct. 18, 2007 for U.S. Appl. No. 09/663,483.
Office Action dated Oct. 16, 2007 for U.S. Appl. No. 09/661,130.
Office Action dated Nov. 28, 2007 for U.S. Appl. No. 09/952,520.

(56) References Cited

OTHER PUBLICATIONS

A lightweight Protocol for Interconnection Heterogenous Devices in Dynamic Environments, (c) 1999, obtained from the Internet at : http//ieeexplore.ieee.org/iel5/6322/16898/00778477.pdf.
The Guide to Computing Literature, Jairo A.: A Framework and Lightweight Protocol for Multimedia Network Management, vol. 8, Issue 1, published 2000, ISSN: 1064-7570.
Bookfinder4u.com: High Performance Networks by Ahmed N. Tantawy, ISBN-10: 0792393716, Published 1993, Lightweight Protocols.
Ipinfusion white paper: Virtual Routing for Provide Edge Application, obtained from the Internet at: http://www.ipinfusion.com/pdf/VirtualRouting_app-note_3rev0302.pdf, pp. 1-8.
Non-Final Office Action for U.S. Appl. No. 10/991,969, dated Feb. 20, 2008.
Non-Final Office Action for U.S. Appl. No. 10/273,669, dated Feb. 20, 2008.
Non-Final Office Action for U.S. Appl. No. 10/949,943 dated Feb. 14, 2008.
Restriction Requirement for U.S. Appl. No. 11/556,697, dated Mar. 13, 2008.
Office Action dated Aug. 1, 2007 for U.S. Appl. No. 10/163,260.
Amendment and Response filed on May 23, 2007 for U.S. Appl. No. 10/163,260.
Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.
Restriction Requirement dated Mar. 22, 2004 for U.S. Appl. No. 09/663,483.
Office Action dated Sep. 11, 2007 for U.S. Appl. No. 09/661,637.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.
Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Supplemental Amendment and Response filed on Sep. 17, 2007, for U.S. Appl. No. 09/663,457.
Non-Final Rejection for U.S. Appl. No. 13/092,962 mailed Aug. 30, 2013.
Non-Final Rejection for U.S. Appl. No. 13/295,077 mailed May 6, 2013.
Final Rejection for U.S. Appl. No. 12/906,999 mailed May 9, 2013.
Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.
Amendment and Response filed on Aug. 10, 2007 for U.S. Appl. No. 10/163,260.
Notice of Allowance for U.S. Appl. No. 12/477,124 mailed Sep. 19, 2012.
Notice of Allowance for U.S. Appl. No. 11/460,977 mailed Dec. 27, 2010.
Non-Final Rejection for U.S. Appl. No. 11/460,977 mailed Jul. 2, 2010.
Notice of Allowance for U.S. Appl. No. 12/762,362 mailed May 22, 2012.

(56) References Cited

OTHER PUBLICATIONS

Non-Final Rejection for U.S. Appl. No. 12/762,362 mailed Feb. 2, 2012.
Notice of Allowance for U.S. Appl. No. 13/359,960 mailed Jan. 9, 2013.
Notice of Allowance for U.S. Appl. No. 13/015,880 mailed Dec. 5, 2012.
Notice of Allowance for U.S. Appl. No. 14/178,215 mailed Jul. 15, 2015.
Non-Final Rejection for U.S. Appl. No. 14/714,270 mailed Jul. 29, 2015.

* cited by examiner

IDENTIFYING NODES IN A RING NETWORK

CROSS REFERENCE TO RELATED APPLICATIONS

This application is a continuation of U.S. patent application Ser. No. 12/762,362, filed Apr. 18, 2010, now U.S. Pat. No. 8,208,409, which is a divisional of U.S. patent application Ser. No. 11/460,977, now U.S. Pat. No. 7,890,663, filed on Jul. 29, 2006, which is a divisional of U.S. patent application Ser. No. 09/894,471, now U.S. Pat. No. 7,181,547, filed on Jun. 28, 2001, each of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2001-2012, Fortinet, Inc.

BACKGROUND

1. Field

Embodiments of the present invention generally relate to computer networks and more particularly to the identification of nodes on a ring network.

2. Description of the Related Art

The interest in the computer networks is growing every day, as more and more users want the capability to access information at remote locations. A computer network is composed of nodes and the communication links between the nodes. In order for a first node to access information at a remote node, the first node must have a way to know that the remote node exists. Thus, the nodes in the network need configuration information that described the topology of the other nodes in the network.

In prior networks, a predetermined master node would send a query to every node address asking whether a node exists at that address. When the master node received acknowledgment back, it would then know at which addresses other nodes existed. Whenever nodes were added to or removed from the network, the master node needed to repeat these queries to determine the new node topology, which was a time-consuming task. Thus, these prior networks suffered from heavy network traffic and performance problems. Further, if the master node was removed or disabled, the network had no way of determining the network topology.

Hence, there is a need for a solution that overcomes the problems of the prior art and provides an improved technique for determining network topology.

SUMMARY

Methods, systems and data structure are described for facilitating identification of nodes in a ring network. According to one embodiment, a data structure is stored on a computer-readable storage media of a node of multiple nodes participating in a ring network. The data structure includes a packet-ring master field, a control-node master field, a node characteristics field, a connection state field, a node identification field and a marker field. The packet-ring master field indicates whether the node is a current packet-ring master. The control-node master field indicates whether the node is a control-node master. The node characteristics field specifies per-node characteristics. The connection state field indicates a current connection state of the node. The node identification field specifies the node. The marker field indicates whether the data structure is a node discovery marker.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods, systems and data structure are described for facilitating identification of nodes in a ring network. In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention. The following detailed description is, therefore, not to be taken in a limiting sense.

In the figures, the same reference number is used throughout to refer to an identical component which appears in multiple figures. Signals and connections may be referred to by the same reference number or label, and the actual meaning will be clear from its use in the context of the description.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form to electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing," "computing," "calculating," "determining," "displaying," or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission, or display devices.

Figure 1:
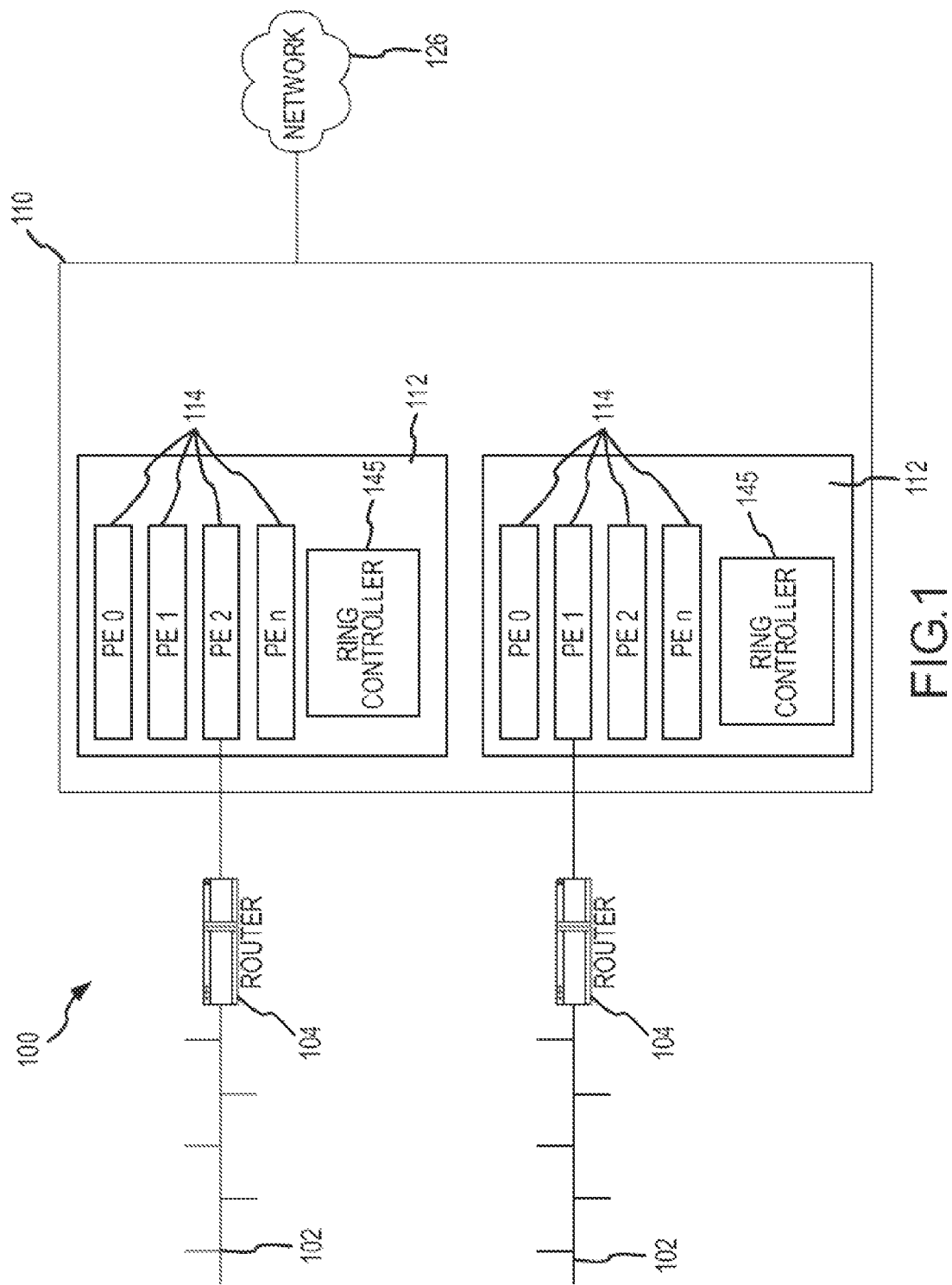
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, system 100 includes service processing switch 110, access routers 104, and network 116. In one embodiment, service processing switch 110 provides switching, routing, and computing resources that can be allocated by a service provider to customers. In one embodiment, service processing switch 110 is the IPSX 9000 service processing switch from CoSine Communications, Inc. But, the invention is not limited to any particular switch, router, or service processing hardware.

Service processing switch 110 includes one or more blades 112. In some embodiments, blades 112 have a type associated with them. Examples of blade types include processing functions such as network blades, control blades, trunk blades, and processor blades. Network blades provide interfaces to different types of networks. Control blades provide system management and accounting functions to service processing system 110. Trunk blades provide access to high speed trunk networks. Processor blades provide general purpose computer processors that in some embodiments provide firewall, intrusion detection, or directory services. Blades are communicably coupled to one another via a packet ring or rings, as further described below with reference to FIG. 2. Referring again to FIG. 1, each blade includes ring controller 145, which contains logic for interfacing to a ring network that connects the blades, as further described below with reference to FIGS. 3-5.

Referring again to FIG. 1, each of blades 112 includes one or more processing elements 114. Processing elements 114 includes CPUs and memory that provide computing resources for the blade, as further described below with reference to FIG. 2. Referring again to FIG. 1, the invention is not limited to any particular number of processing elements on a blade, nor is the invention limited to any particular number of blades in a service processing switch 110. Software tasks, in some embodiments, are split up such that one processor operates on one part of the data and another processor operates on another part of the data. In other embodiments, the various processing portions of a task all run on a single processor, multiprocessing with other tasks that share that processor. Thus, the hardware provides scalability, where low-end systems include few processors that do all the work, and high-end systems include one hundred or more processors and the work is distributed among the processors for greater speed and throughput.

Service processing system 110 is typically communicably coupled to a network 116, of example the Internet. Network 116 can also be a Wide Area Network (WAN), a Local Area Network (LAN), or a private network. Service processing system 110 is also typically communicatively coupled to a plurality of customer networks 102 via customer access routers 104.

Figure 2:
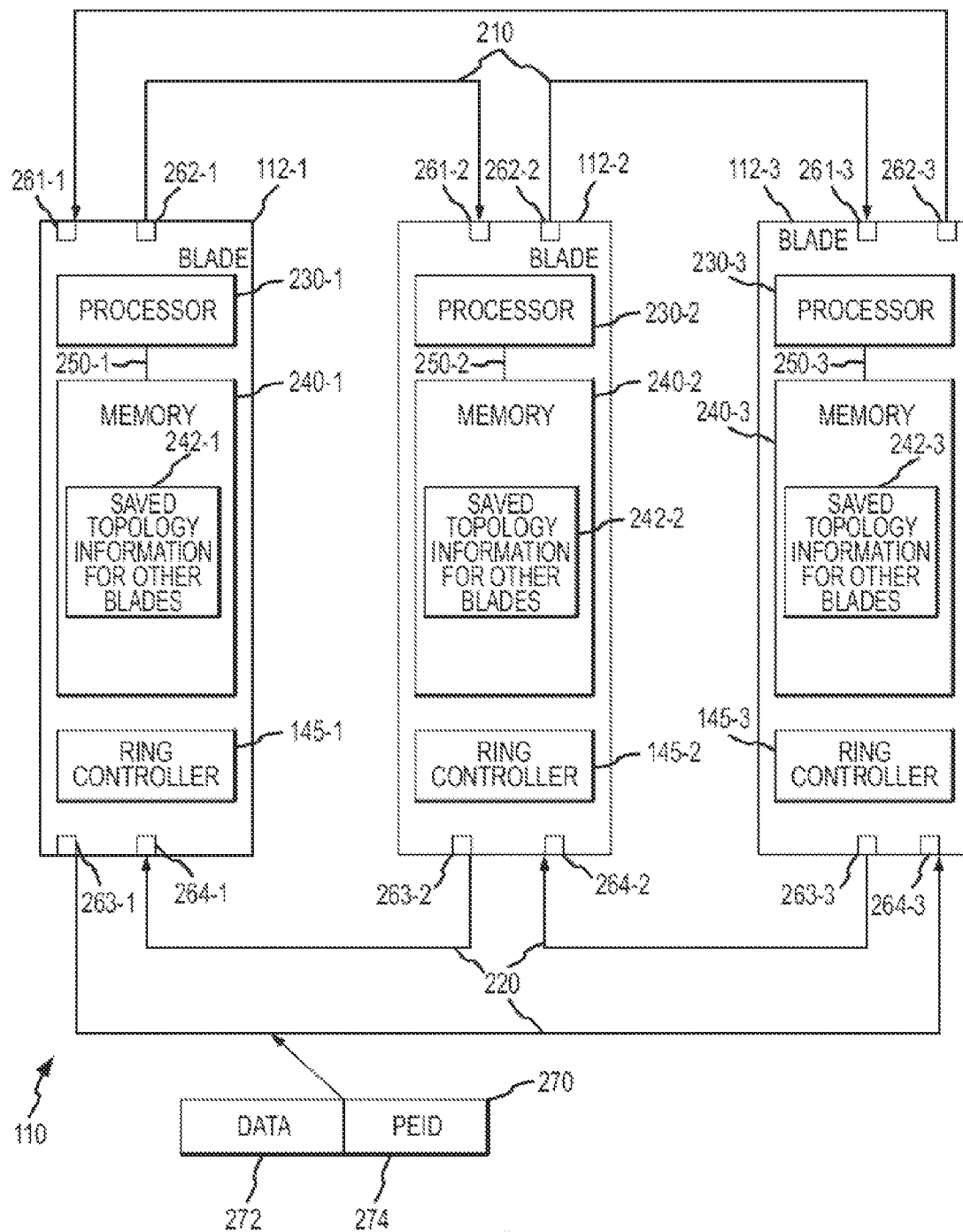
FIG. 2 is a block diagram of a multi-blade system connected via a ring network, according to an embodiment of the invention.

FIG. 2 is a block diagram of a multi-blade system connected via a ring network within service processing system 110, according to an embodiment of the invention. In some embodiments, each of two network rings 210 and 220 communicatively connect blades 112-1, 112-2, and 112-3 together. Although three blades are shown, in another embodiment any number can be present. Blade 112-1 contains processor 230-1 and memory 240-1 connected via system bus 250-1. Blade 112-1 also contains ring controller 145-1. Blade 112-2 contains processor 230-2 and memory 240-2 connected via system bus 250-2. Blade 112-1 also contains ring controller 145-2. Blade 112-3 contains processor 230-3 and memory 240-3 connected via system bus 250-3. Blade 112-1 also contains ring controller 145-3. Each blade optionally includes other hardware; for example although only one processor and memory are shown in the blades, each can contain multiple processors and multiple memories, as previously described above with reference to FIG. 1.

Referring again to FIG. 2, each memory 240-1, 240-2, and 240-3 contains respective topology information for the other blades 242-1, 242-2, and 242-3, which contains a discovery marker's connection state, the control blade master state, and blade characteristics. The topology information is further described below with reference to FIG. 5.

Referring again to FIG. 2, network ring 210 is a primary ring, which connects the blades in one direction, and network ring 220 is a protect ring, which connects the blades in the opposite direction. Primary ring 210 is used for normal packet transmission and reception, unless a break is detected in the ring as a result of blade failure or removal. When connection faults are detected, the affected blades begin using protect ring 220 to bypass the bad or missing connection. The packet ring hardware manages and discovers topology changes, and provides software with a current topology map, as further described below with reference to FIGS. 4 and 5.

Blade 112-1 contains primary-ring receive port 261-1, primary-ring transmit port 262-1, protect-ring transmit port 263-1, and protect-ring receive port 264-1. Blade 112-2 contains primary-ring receive port 261-2, primary-ring transmit port 262-2, protect-ring transmit port 263-2, and protect-ring receive port 264-2. Blade 112-3 contains primary-ring receive port 261-3, primary-ring transmit port 262-3, protect-ring transmit port 263-3, and protect-ring receive port 264-3.

Rings 210 and 220 are packet-passing rings. Each packet 270 placed in the rings includes a data portion 272 and a processor element identifier (PEID 274), which identifiers the destination processor for the packet. If the PEID matches a processor on its particular blade, the blade 112 passes the packet to the proper processor; if not, the packet is forwarded to the next blade. Although packet 270 is shown as traveling in ring 220, it can also travel in ring 210.

Although the embodiment of FIG. 2 has been described in the context of a network of blades within a switch, the invention applies equally to any nodes in a network, whether the nodes are contained within the same housing, located within the same room, or situated vast geographical distances apart.

In the previous section, a system level overview of the operation of exemplary embodiments of the invention was described. In this section, the particular methods of the invention performed by an operating environment executing an exemplary embodiment are described. In one embodiment the methods to be performed constitute computer programs made up of computer-executable instructions. But, in other embodiments the methods can be implemented using hardware in lieu of a processor-based system. Describing the methods enables one skilled in the art to develop such programs including such instructions to carry out the methods on suitable computers (the processor of the computer executing the instructions from computer-readable media). Describing the methods also enables one skilled in the art to develop hardware to carry out the described methods.

Figure 3:
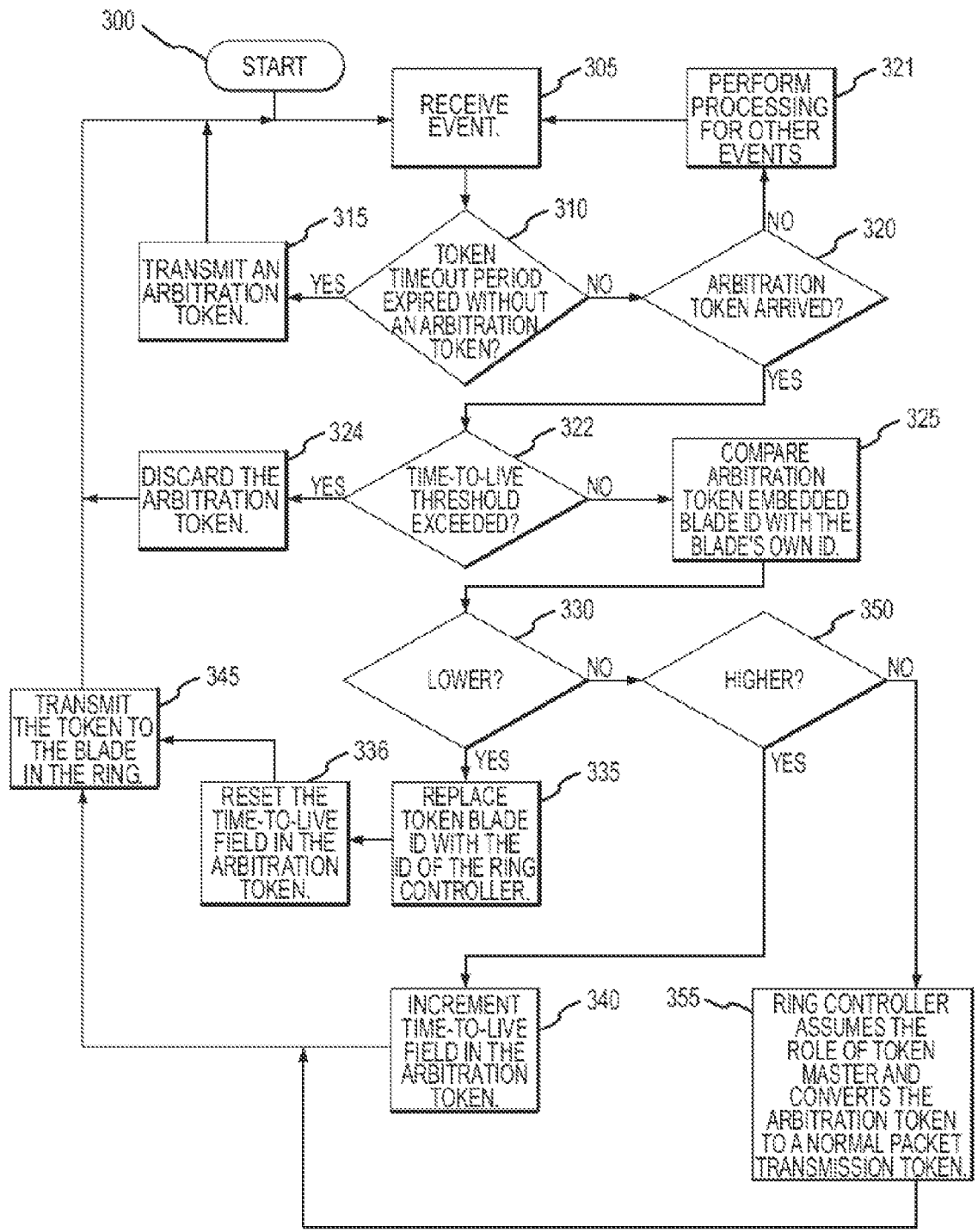
FIG. 3 is a flowchart of master blade arbitration logic, according to an embodiment of the invention.

FIG. 3 is a flowchart of token master blade arbitration logic, according to an embodiment of the invention. The functions described in FIG. 3 are carried out by any of blades 112. Packet rings 210 and 220 use a token arbitration scheme, allowing one blade (the blade that has most recently received a token marker) to transmit locally generated packets. A token marker is a one-cycle message with a unique encoding. At power-up, or after a connection state transition, a token may not be present in the packet ring. When this happens, a single blade takes responsibility for generating a token, so that packet transmission can proceed. This single blade is referred to as the token master blade, and the token master arbitration logic is described as follows.

Control begins at block 300. Control then continues to block 305 where an event is received at the blade. Control then continues to block 310 where blade 112 determines whether the event previously received at block 305 was a token timeout period expiration event. The token timeout period can expire, for example, when a blade insertion/removal event causes token loss or when no token has yet been generated following power-up.

If the determination at block 310 is true, then control continues to block 315 where blade 112 transmits an arbitration token on the ring network. In this way, a blade generates an arbitration token whenever a token timeout period has passed without detecting the arrival of a token. In one embodiment, the token timeout period is calculated by multiplying (max system blade count*(max packet delay+ring I/O latency) *clock period). In this token-based ring network, an arbitration token is passed around the nodes of the ring, and only the node that currently has the token has permission to send a packet on the ring. Control then returns to block 305, as previously described above.

If the determination at block 310 is false, then control continues to block 320 where blade 112 determines whether an arbitration token arrived event occurred at block 305. If the determination at block 320 is false, then control continues to block 321 where processing for other events occurs. Control then returns to block 305, as previously described above.

If the determination at block 320 is true, then control continues to block 322 where blade 112 determines whether the time-to-live field in the received arbitration token exceeds the time-to-live threshold. If the determination at block 322 is true, then control continues to block 324 where blade 112 discards the arbitration token. Control then returns to block 305 as previously described above.

If the determination at block 322 is false, then control continues to block 325 where blade 112 compares the arbitration token blade ID with its own local blade ID. From block 325, control continues to block 330 where blade 112 determines whether the arbitration token blade ID is a lower priority than the ring controller blade ID. If the determination at block 330 is true, then control continues to block 335 where blade 112 replaces the token blade ID with the ID of the ring controller. Control then continues to block 336 where blade 112 resets the time-to-live field in the arbitration token. Control then continues to block 345 where blade 112 transmits the token to the next blade in the ring. Control then returns to block 305, as previously described above.

If the determination at block 330 is false, the control continues to block 350 where blade 112 determines whether the arbitration token blade ID is at a higher priority than the ring controller blade ID. If the determination at block 350 is true, then control continues to block 340 where blade 112 increments the time-to-live field in the arbitration token. Control then controls to block 345, as previously described above.

If the determination at block 350 is false, then the arbitration token blade ID has an equal priority to the ring controller blade ID, so control continues to block 355 where blade 112 makes itself the token master blade and converts the received arbitration token to a normal packet transmission token. Thus, once the arbitration token previously generated at block 315 is passed all the way around the ring network and back to this blade unmodified by any higher priority blade, this blade becomes the master blade. Control then continues to block 345, as previously described above.

Figure 4:
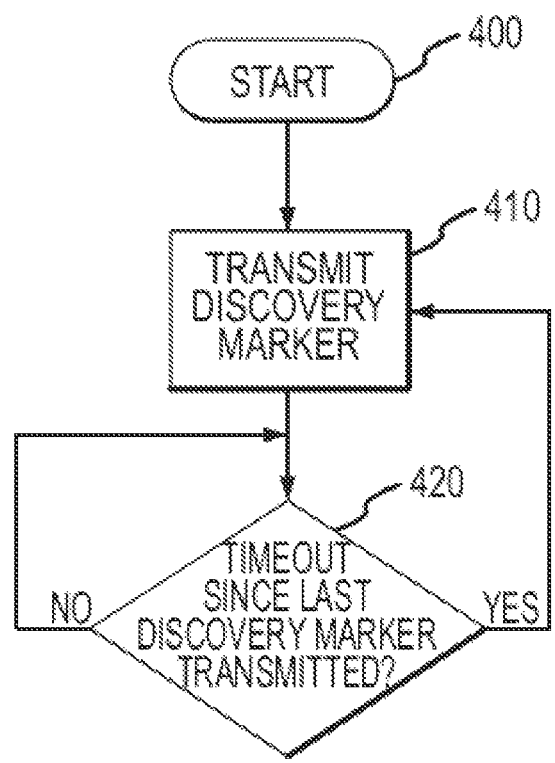
FIG. 4 is a flowchart of the master blade functions, according to an embodiment of the invention.

FIG. 4 is a flowchart of the token master blade functions, according to an embodiment of the invention. A blade became a token master blade as previously described above with reference to blocks 315 and 355. Control begins at block 400. Control then continues to block 410 where the master blade transmits a discovery marker. A discovery marker is further described below with reference to FIG. 6. Control then continues to block 420 where the master blade determines whether a period of time has expired since the last discovery marker was transmitted. If the determination at block 420 is false, then control returns to block 420. If the determination at block 420 is true, then control returns to block 410. In this way, the master blade periodically transmits a discovery marker.

Figure 5:
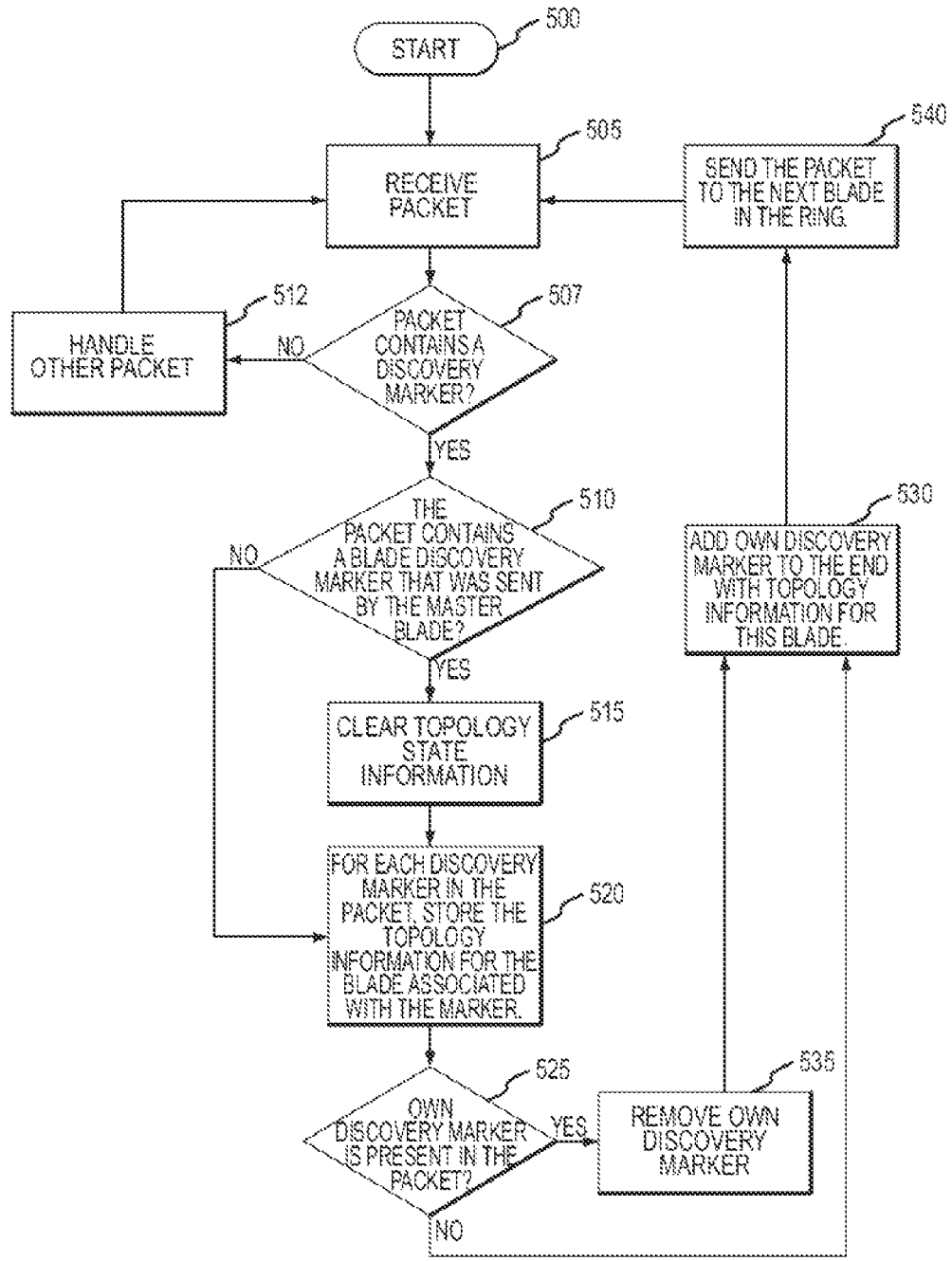
FIG. 5 is a flowchart of blade discovery logic, according to an embodiment of the invention.

FIG. 5 is a flowchart of blade discovery logic, according to an embodiment of the invention. Control begins at block 500. Control then continues to block 500 where blade 112 receives a packet from the packet ring. Control then continues to block 507 where blade 112 determines whether the packet contains any discovery markers. If the determination at block 507 is false, then control continues to block 512 where other types of packets are handled. Control then returns to block 505, as previously described above.

If the determination at block 507 is true, then control continues to block 510 where blade 112 determines whether any of the discovery markers in the packet were sent by the master blade. A blade discovery marker was sent at block 410, as previously described above with reference to FIG. 4.

Referring again to FIG. 5, if the determination at block 510 is true, then control continues to block 515 where blade 112 clears its topology information (242-1, 242-2, or 242-3, depending on the blade) for all known blades. Control then continues to block 520 where blade 112, for each marker in the packet, stores the topology information for the blade associated with the marker.

If the determination at block 510 is false, then control continues directly to block 520, as previously described above.

From block 520, control then continues to block 525 where blade 112 determines whether its own discovery marker is present in the packet. If the determination is false, then control continues to block 530 where blade 112 adds its own discovery marker to the end of the packet, including its own topology information. Control then continues to block 540 where blade 112 sends the packet to the next blade in the ring. Control then returns to block 505, as previously described above.

If the determination at block 525 is true, the control continues to block 535 where blade 112 removes its own discovery marker from the packet. Control then continues to block 530, as previously described above.

In this way all blades in the packet ring see a discovery marker and associated topology information for every other active blade.

Figure 6:
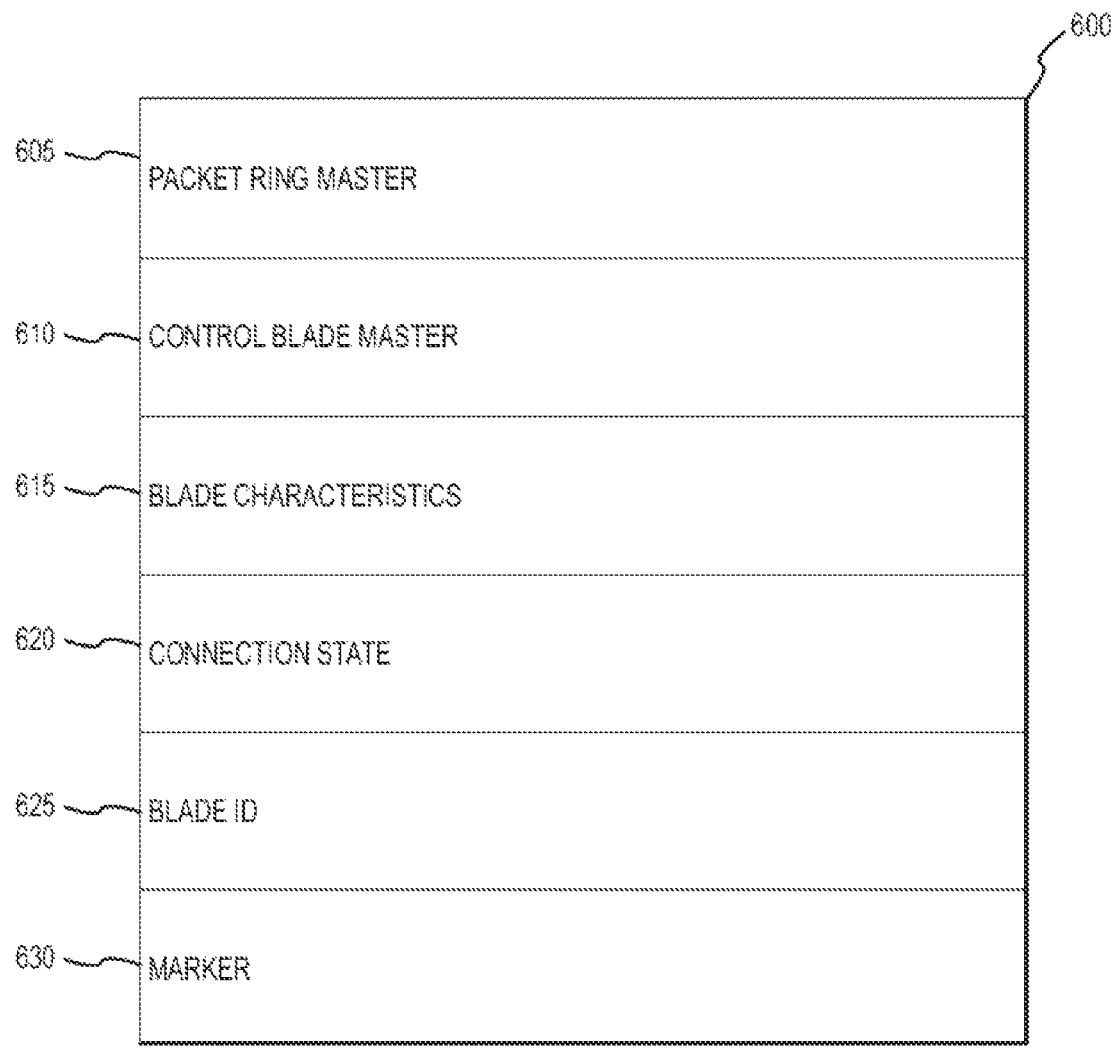
FIG. 6 describes a discovery marker data structure, according to an embodiment of the invention.

FIG. 6 describes discovery marker data structure 600, according to an embodiment of the invention. Discovery marker data structure 600 includes packet ring master field 605, control blade master field 610, blade characteristics field 615, connection state field 620, blade ID field 625, and marker field 630.

Packet ring master field 605 contains an indication of whether the originating blade is the current packet ring token master blade. Control blade master field 610 contains an indication of whether the blade is the control blade master. Blade characteristics field 615 specifies per-blade characteristics, which is information that can be used to distinguish the features of the blade.

Connection state field 620 contains an indication of the blade's current connection state for its primary and protect ring neighbors. Connection state field 620 allows blades to only switch-in a neighboring blade when both blades agree that the connection is good. It also allows a blade that detect a connection fault to notify their neighbor before switching out. This prevents situations where one side of a connection switches while the other side does not, causing a long-term break in the packet ring.

Blade ID field 625 contains a slot identifier for the associated blade. Marker field 630 identifies this marker as a blade discovery marker.

What is claimed is:

1. A node operable in a ring computer network, the node comprising:
   a processor;
   a memory coupled to the processor; and
   a ring controller, wherein the ring controller:
      receives a packet containing a network token;
      if the network token does not arrive within a preselected network timeout period, generates an arbitration token; and
      if the packet contains an arbitration token, checks to see if the arbitration token was modified by a higher priority node of a plurality of nodes within the ring computer network, each of which have a priority, and if not, sets the node as a token master node and converts the arbitration token to a packet transmission token, wherein arbitration tokens are used to identify a token master of the plurality of nodes, which are responsible for generating a packet transmission token onto the ring computer network and wherein the packet transmission token authorizes a transmitting node of the plurality of nodes that has most recently received the packet transmission token to transmit locally generated packets onto the ring computer network.

2. The node of claim 1, wherein the packet contains a plurality of discovery markers and for each discovery marker of the plurality of discovery markers, the ring controller saves topology information associated therewith; and adds to the packet a first discovery marker when the packet does not contain the first discovery marker, wherein the first discovery marker comprises topology information associated with the node; and sends the packet to a next node of the plurality of nodes in the ring computer network.

3. The node of claim 2, wherein: when the packet contains a discovery marker associated with a first node of the plurality of nodes, the ring controller is to clear old topology information on the node prior to saving the topology information associated with the discovery marker associated with the first node.

4. The node of claim 2, wherein: when the packet does contain the first discovery maker, the ring controller is to remove the first discovery marker from the packet.

5. The node of claim 2, wherein the topology information further comprises: a connection state, a control master state, and node characteristics.

6. The node of claim 2, wherein each of the plurality of discovery markers include a packet ring master field; a control master field; and the topology information.

7. The node of claim 1, wherein the node comprises a blade in a switch.

8. A switch, comprising:
   a ring network; and
   a plurality of blades connected to the ring network, wherein each blade further comprises a ring controller, wherein the ring controller:
      receives a packet containing a network token;
      if the network token does not arrive within a preselected network timeout period, generates an arbitration token;
      if the packet contains an arbitration token, checks to see if the arbitration token was modified by a higher priority blade of the plurality of blades and if not, sets a blade of the plurality of blades with which the ring controller is associated as a token master blade and converts the arbitration token to a packet transmission token, wherein arbitration tokens are used to identify a token master of the plurality of blades, which are responsible for generating a packet transmission token onto the ring network and wherein the packet transmission token authorizes a transmitting blade of the plurality of blades that has most recently received the packet transmission token to transmit locally generated packets onto the ring network.

9. The switch of claim 8, wherein the packet contains a plurality of discovery markers and for each discovery marker of the plurality of discovery markers, the ring controller saves topology information associated therewith; adds to the packet a first discovery marker when the packet does not contain the first discovery maker, wherein the first discovery marker comprises topology information associated with the blade; and sends said packet to a next blade of the plurality of blades.

10. The switch of claim 9, wherein: when the packet contains a discovery marker associated with a first blade of the plurality of blades, the ring controller is to clear old topology information on the blade prior to saving the topology information associated with the discovery marker associated with the first blade.

11. The switch of claim 9, wherein: the ring controller is to remove the first discovery marker from the packet when the packet does contain the first discovery marker.

12. The switch of claim 9, wherein the topology information further comprises: a connection state, a control master state, and node characteristics.

13. The switch of claim 9, wherein each of the plurality of discovery markers include a packet ring master field; a control master field, and the topology information.

14. A method of determining a token master on a ring network, the method comprising:
receiving a packet containing a network token at a first node of a plurality of nodes, each of which have a priority, on the ring network;
if the network token does not arrive within a preselected network timeout period, generating an arbitration token;
if the packet contains an arbitration token, checking to see if the arbitration token was modified by a higher priority node of the plurality of nodes of the ring network and if not, setting the first node as a token master and converting the arbitration token to a packet transmission token, wherein arbitration tokens are used to identify a token master of the plurality of nodes, which are responsible for generating a packet transmission token onto the ring network and wherein the packet transmission token authorizes a transmitting node of the plurality of nodes that has most recently received the packet transmission token to transmit locally generated packets onto the ring network.

15. The method of claim 14, wherein the packet contains a plurality of discovery markers and for each discovery marker of the plurality of discovery markers, saving topology information associated therewith; adding to the packet a first discovery marker when the packet does not contain the first discovery maker, wherein the first discovery marker comprises topology information associated with the first node; and sending said packet to a next node of the plurality of nodes on the ring network.

16. The method of claim 15, wherein: when the packet contains a discovery marker associated with a second node of the plurality of nodes, clearing old topology information for the second node on the first node prior to saving the topology information associated with the discovery marker associated with the second node.

17. The method of claim 15, wherein: removing the first discovery marker from the packet when the packet does contain the first discovery marker.

18. The method of claim 15, wherein the topology information further comprises: a connection state, a control master state, and node characteristics.

19. The method of claim 15, wherein the discovery marker further comprises: a packet ring master field; a control master field, and the topology information.

* * * * *